No. 870,539. PATENTED NOV. 12, 1907.
W. F. BOUCHÉ.
SHAFT OSCILLATOR.
APPLICATION FILED SEPT. 14, 1905.
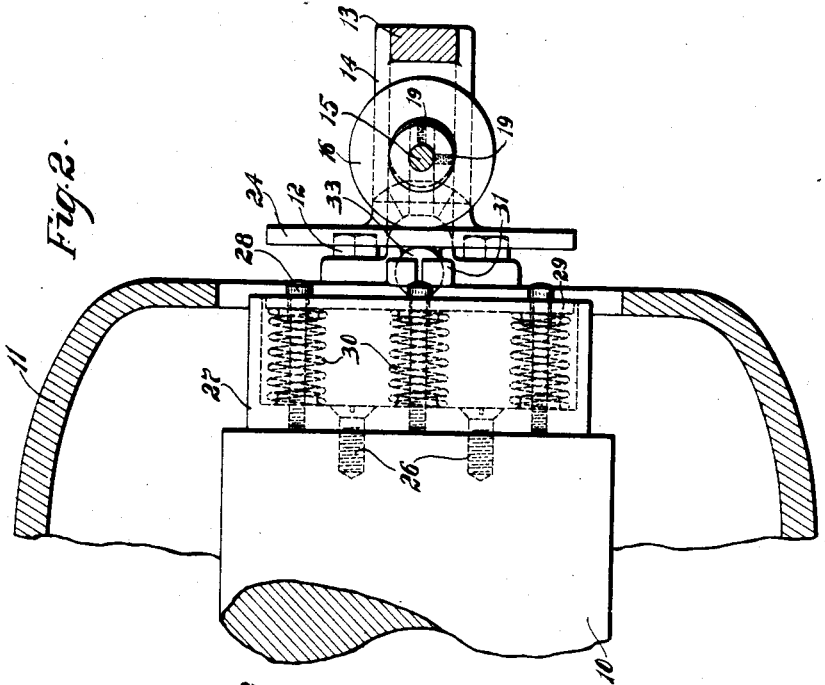
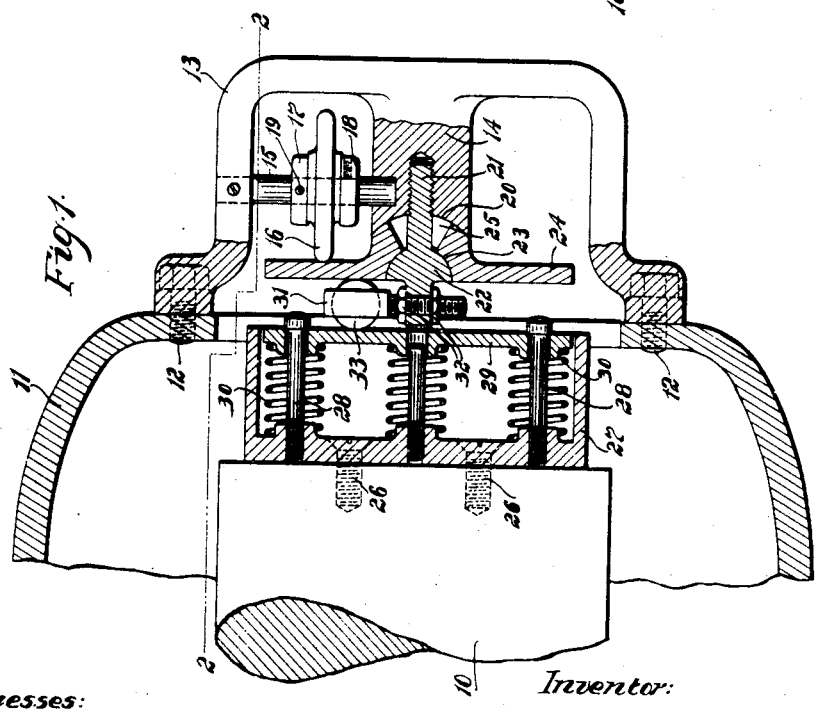
Witnesses:
George J. Schwartz
Fred J. Kinsey
Inventor:
Will F. Bouché.
By
Chas. E. Lord
Attorney.

UNITED STATES PATENT OFFICE.

WILL F. BOUCHÉ, OF NORWOOD, OHIO, ASSIGNOR TO THE BULLOCK ELECTRIC MANUFACTURING COMPANY, A CORPORATION OF OHIO.

SHAFT-OSCILLATOR.

No. 870,539.      Specification of Letters Patent.      Patented Nov. 12, 1907.

Application filed September 14, 1905. Serial No. 278,525.

*To all whom it may concern:*

Be it known that I, WILL F. BOUCHÉ, a citizen of the United States, residing at Norwood, in the county of Hamilton and State of Ohio, have invented certain new and useful Improvements in Shaft-Oscillators, of which the following is a full, clear, and exact specification.

My invention relates to means for oscillating or reciprocating a shaft longitudinally in its bearings.

More specifically the invention relates to an oscillator for the movable element of a dynamo electric machine.

An oscillating movement given to the rotating element of a dynamo electric machine, especially rotary converters and other machines which are not belt connected, causes the shaft of said element to operate better in its bearings and prevents the wearing of grooves and ridges in the commutator of the machine.

The object of my invention is to produce the desired results by means of an oscillator which is simple in construction and effective in its operation.

A further object is to provide an oscillator which can be adjusted to vary the period or extent of oscillation, which adjustments may be made simultaneously or independently of each other.

In carrying out my invention I mount adjacent to the end of the shaft a plate for rotary and oscillatory movements, which plate is engaged on one side by the rotary driving means between the shaft and the plate and on the other side by an eccentrically mounted disk.

More specifically considered my invention consists of a dynamo electric machine having a shaft, a yielding end member therefor, a plate mounted for rotary and oscillatory movements about a point in line with the center of the shaft, which plate is driven by a rolling member engaging the yielding end member and the plate, and an eccentrically mounted disk engaging the other side of the plate for imparting an oscillatory movement thereto, the positions of said rolling member and of said disk being adjustable whereby the period and length of the oscillation of the shaft can be changed at will.

My invention still further consists of the details of construction and the combination of elements described in the specification and set forth in the appended claims.

In the accompanying drawings which illustrate one form of my invention, Figure 1 represents a sectional plan view of a shaft end and bearing of a dynamo electric machine having my improved shaft oscillator attached thereto; and Fig. 2 is a sectional elevation, the section being taken approximately along the line 2—2 of Fig. 1.

Referring to the drawings, the shaft to be oscillated is indicated by 10, and is mounted in a bearing surrounded by the bearing housing 11. Fastened to the end of the bearing housing by means of bolts 12 is the supporting bracket or frame 13 for the shaft oscillator. Mounted between the upper arm of the bracket and a horizontal inwardly extending arm 14 of the bracket is the relatively fixed spindle 15, on which is rotatively mounted the eccentric disk 16 which may be made of hardened steel, phosphor bronze or other equally hard material. This disk is normally held against movement longitudinally on the spindle, by means of the collars 17 and 18, provided with set screws 19. The position of the disk on the spindle may be adjusted by changing the position of the collars 17 and 18

The horizontal arm 14 is provided at its inner end with a spherical bearing surface 20. Screwed into the center of the arm is the stud 21, which has an enlarged portion 22 having a hemi-spherical surface 23. Rotatably mounted on the stud and between the bearing surfaces 20 and 23 is the plate 24. This plate has at its center a conical shaped opening 25, whereby the plate will have a limited universal movement around the center of the spherical bearing surfaces 20 and 23, or will have both a rotary and an oscillatory movement.

Mounted on the end of the shaft and held thereto by screws 26 is the cylindrical casing 27. Extending outward from the end of the casing are a number of pins or studs 28 on the ends of which is slidably mounted the plate 29 which is yieldingly pressed outward by the springs 30 surrounding the pins 28.

Mounted in the end of the stud 21 is the stirrup or yoke 31 held adjustably thereto by nuts 32. This yoke carries at its outer end a rolling member preferably a ball 33, which is adapted to transmit motion from the shaft to the plate.

As the shaft 10 rotates, rotary motion is communicated by means of the rolling member 33 to the plate 24, which in turn communicates the rotary motion to the disk 16. The rotating disk on account of its eccentric mounting causes the upper part of the plate to move to the left or to turn about the center of the spherical bearing surface. This movement is then communicated by means of the rolling member 33 to the yielding plate on the end of the shaft, which is then forced to the left against the normal bias of the machine. The normal bias in dynamo electric machines is produced by the action of the magnetic fluid in which the armature rotates. The shaft oscillator should be so mounted and adjusted that this normal bias maintains the plate 24 in contact with the periphery of the disk at all times.

If it is desired to adjust the length of oscillation the position of the stirrup or yoke is changed. If the ball is moved outward, the length of the oscillations will be increased. If it is moved inward the length of oscillation will be decreased. If it is desired to adjust the period of oscillation the position of the eccentric disk will be changed. By moving the disk outward so that it will bear on the plate 24 near its periphery, the number of oscillations per minute will be increased, and on the other hand if the disk is moved toward the axle of the shaft the number of oscillations will be decreased. It will be noted that by adjusting the position of the disk, not only will the period of oscillation be changed but the length of oscillation will also be changed. Thus when the disk is moved toward the periphery of the plate 24, the length of oscillation of the shaft will be decreased. If it is desired to adjust the period of oscillation without changing the length of oscillation the positions of both the disk and rolling member will be changed. If the rolling member is near the periphery of the plate and if the eccentric disk is near the axis of the shaft it is seen that there will result a length of oscillation greater than the eccentricity of the disk. Therefore since the length of stroke or oscillation depends not only on the eccentricity of the disk but also on the positions of the disk and ball, a small disk can be employed to obtain a comparatively long stroke or oscillation. Thus by employing a small disk considerable space will be saved at the end of the machine, which is an important feature.

I aim in my claims to cover all modifications which do not depart from the spirit and scope of my invention.

What I claim as new and desire to secure by Letters Patent is:—

1. In combination, a shaft, a shaft oscillator therefor, comprising an eccentric disk, a plate mounted for universal movement and engaged by the periphery of said disk, and means for transmitting oscillatory movement between said plate and said shaft.

2. In combination, a shaft, a shaft oscillator therefor, comprising a disk eccentrically mounted on a spindle, a plate engaged by the periphery of said disk and mounted for rotary and oscillatory movement, and means for transmitting oscillatory movement from the plate to the shaft.

3. In combination, a shaft, a plate adjacent thereto and mounted to turn about a single point, a rotary member between said shaft and said plate engaging the adjacent surfaces thereof, and a disk eccentrically mounted on a spindle and having its periphery in engagement with said plate.

4. In combination, a shaft, a yieldingly mounted plate on the end of said shaft, and a shaft oscillator comprising a plate or disk mounted for rotary and oscillatory movement about a point in line with the axis of the shaft, a disk eccentrically mounted and having its periphery in engagement with said plate or disk, and means for transmitting movement between said plate or disk and the yieldingly mounted plate on the shaft.

5. In combination, a shaft, and a shaft oscillator comprising a disk eccentrically mounted on a spindle at right angles to the axis of the shaft, a plate engaged on one side by the periphery of the disk and mounted for both rotary and oscillatory movement, and a member engaging the other side of the plate and the end of the shaft for transmitting movement between said shaft and plate.

6. In combination, a shaft, and a shaft oscillator comprising a plate mounted for universal movement, a rolling member between the end of the shaft and one side of said plate, and a disk eccentrically mounted on a spindle at right angles to the axis of the shaft and engaging the other side of the plate.

7. In combination, a shaft, and a shaft oscillator comprising a plate mounted for universal movement, a rolling member between the end of the shaft and one side of the plate, and a disk eccentrically mounted and engaging the other side of the plate and means for adjusting the position of the roller bearing between the shaft and plate whereby the length of oscillation imparted to the shaft may be adjusted.

8. In combination, a shaft, a shaft oscillator, comprising a plate mounted for rotary and oscillatory movement, means engaging the end of the shaft and one side of the plate for imparting rotary movement to the plate, an eccentric disk engaging the other side of the plate, and means for adjusting the position of said disk whereby the period and length of oscillation may be adjusted.

9. In a dynamo electric machine, a shaft, a plate adjacent the end thereof mounted for rotary and oscillatory movement, means engaging the end of the shaft and one side of the plate for imparting rotary movement to the plate, and means engaging the other side of the plate for imparting an oscillatory movement to the plate and shaft.

10. In a dynamo electric machine, a shaft, a yielding end member therefor, a plate mounted for rotary and oscillatory movement about a point in line with the center of the shaft, a roller bearing between one side of the plate and the yielding member on the shaft, means for adjusting the position of the roller bearing, an eccentric disk engaging the other side of the plate, and means for adjusting the position of the disk, whereby the shaft will be oscillated and the period and length of oscillation can be adjusted at will.

In testimony whereof I affix my signature, in the presence of two witnesses.

WILL F. BOUCHÉ.

Witnesses:
  ARTHUR F. KWIS,
  FRED J. KINSEY.